(12) United States Patent
Balsiger (10) Patent No.: US 7,287,241 B2
(45) Date of Patent: Oct. 23, 2007

(54) SNAPLINES FOR CONTROL OBJECT POSITIONING

(75) Inventor: Fred W. Balsiger, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 10/463,268

(22) Filed: Jun. 17, 2003

(65) Prior Publication Data

US 2004/0261012 A1  Dec. 23, 2004

(51) Int. Cl.
*G06F 9/44* (2006.01)

(52) U.S. Cl. ............... 717/105; 717/113; 717/120; 715/762; 715/763

(58) Field of Classification Search ................ 717/105, 717/113, 120; 715/500, 517
See application file for complete search history.

(56) References Cited

U.S. PATENT DOCUMENTS

| | | | | |
|---|---|---|---|---|
| 5,566,295 A * | 10/1996 | Cypher et al. | ............... | 715/763 |
| 5,652,888 A | 7/1997 | Burgess | ............... | 395/683 |
| 5,838,317 A * | 11/1998 | Bolnick et al. | ............... | 715/764 |
| 5,873,106 A * | 2/1999 | Joseph | ............... | 715/506 |
| 6,065,021 A * | 5/2000 | George | ............... | 715/502 |
| 6,178,432 B1 * | 1/2001 | Cook et al. | ............... | 715/513 |
| 6,199,082 B1 | 3/2001 | Ferrel et al. | ............... | 707/522 |
| 6,278,450 B1 | 8/2001 | Arcuri et al. | ............... | 345/334 |
| 6,337,703 B1 * | 1/2002 | Konar et al. | ............... | 715/858 |
| 6,384,849 B1 | 5/2002 | Morcos et al. | ............... | 345/810 |
| 6,785,866 B1 * | 8/2004 | Lewis et al. | ............... | 715/513 |
| 6,941,521 B2 * | 9/2005 | Lin et al. | ............... | 715/762 |
| 7,076,763 B1 * | 7/2006 | DeGroote et al. | ............... | 717/112 |
| 7,093,192 B2 * | 8/2006 | Mullen et al. | ............... | 715/502 |
| 7,093,196 B1 * | 8/2006 | Griffiths et al. | ............... | 715/518 |
| 7,098,933 B1 * | 8/2006 | Thoemmes et al. | ............... | 345/677 |
| 2002/0004755 A1 * | 1/2002 | Balthaser | ............... | 705/26 |
| 2002/0171690 A1 * | 11/2002 | Fox et al. | ............... | 345/862 |
| 2004/0250204 A1 * | 12/2004 | Isaacson | ............... | 715/517 |

OTHER PUBLICATIONS

Badros, Greg J; Nichols, Jeffrey; Borning, Alan; "SCWM: An Intelligent Constraint-Enabled Window Manager", 2000 American Association for Artificial Intelligence, retrieved Oct. 31, 2006 from scholar.google.com.*
Bier, Eric Allan; "Snap-Dragging", p. 233-240, 1986 ACM, retrieved Oct. 31, 2006.*
Masui, Toshiyuki; "HyperSnapping", p. 188-194, 2001 IEEE, retrieved Oct. 31, 2006.*
Kamigaki, Tamotsu and Nakamura, Nobuto; "An Object-Oriented Visual Model-Building and Simulation System for FMS Control," *Simulation*, Dec. 1996, vol. 67, No. 6, pp. 375-385.
Williams, Tom; "User Interface Management System Steps up Application Development," *Computer Design*, Jun. 1, 1990, vol. 29, No. 11, p. 56 and p. 58.
"Converter: Creating a User Interface With Interface Builder," Inside Max OS X, Chapter 1, Apple Computers, Inc., Jun. 2002, pp. 1-24, also available at http://developer.apple.com/techpubs/macosx/DeveloperTools/InterfaceBuilder/Converter.pdf.

* cited by examiner

*Primary Examiner*—Mary Steelman
(74) *Attorney, Agent, or Firm*—Workman Nydegger (57) ABSTRACT

A visual code designer is provided that allows a user to manipulate control objects on a common design surface. Each control object has extensible snaplines that define alignment characteristics for the control. The snaplines are extensible in that a developer can define and/or specify matching and alignment criteria such as type, filter and offset information. Further, the visual code designer assists the user in positioning a control on the common design surface by automatically aligning the control during design-time without the use of gridlines.

42 Claims, 6 Drawing Sheets

SNAPLINES FOR CONTROL OBJECT POSITIONING

CROSS-REFERENCE TO RELATED APPLICATIONS

N/A

BACKGROUND OF THE INVENTION

1. The Field of the Invention

The present invention generally relates to visual code designers. More particularly, the present invention relates to extensible user interface feedback during the positioning of control components to assist a user in aligning the components on a common design surface.

2. Background and Relevant Art

Visual code designers are software engineering tools that increase productivity by simplifying user interface (UI) development and maintenance. A visual code designer simplifies the coding of complex UI applications by providing the user with building blocks (or controls) representing UI components. These building blocks are manipulated by a user on a common design surface into a cohesive UI, thereby allowing a smaller workforce to develop large amounts of UI software in shorter time periods. Further, a visual code designer enhances usability by providing a development team with a prototype so that proposed UI changes can be readily demonstrated for validation and acceptance. This aspect can decrease the turnaround time for making UI changes in development and maintenance phases.

Figure 1A:
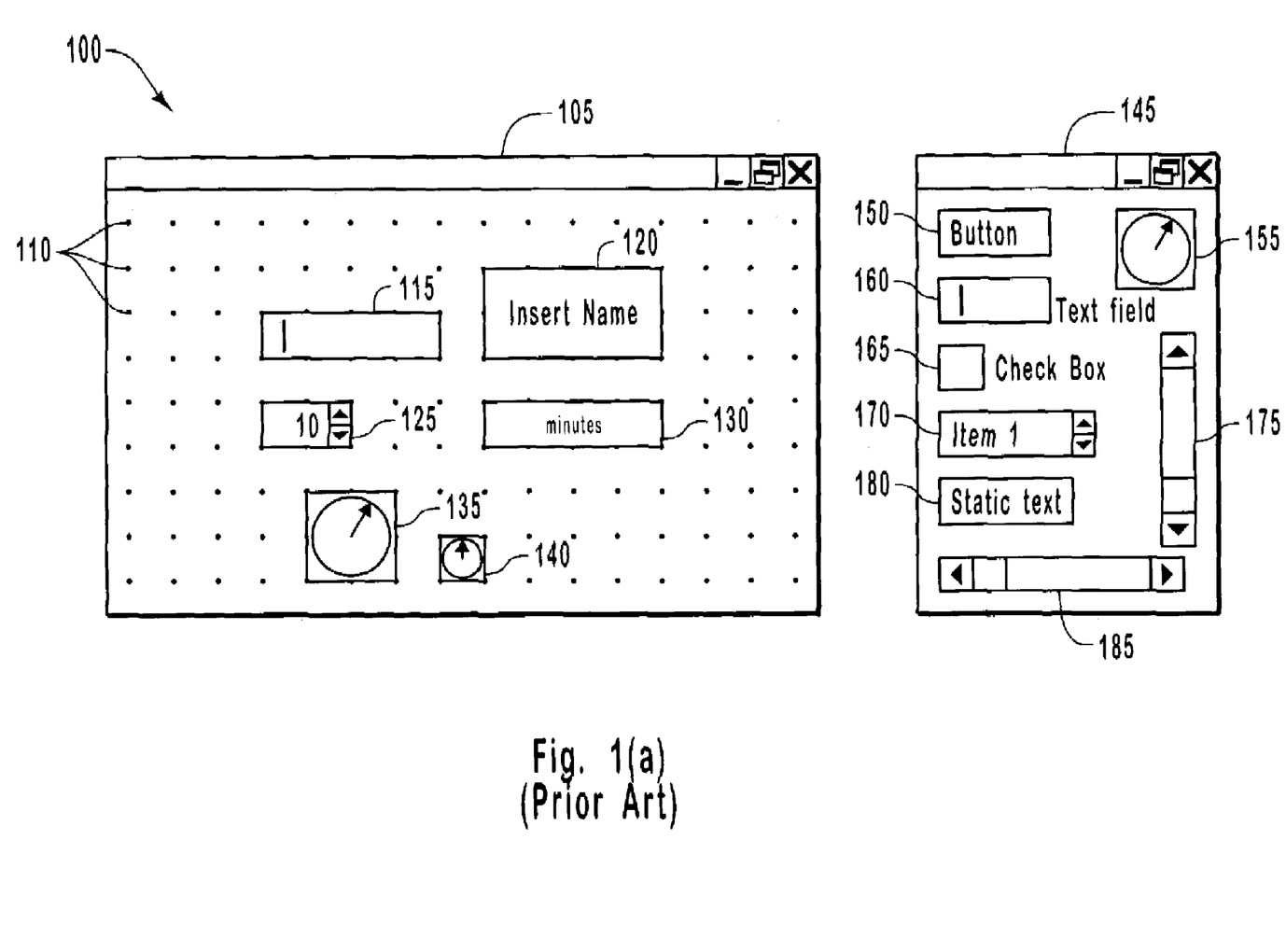
FIG. 1(a) illustrates a prior art visual code designer during design-time.

FIG. 1(a) illustrates typical basic building blocks of a Visual Code Designer 100 during design-time. A common Design Surface 105 is provided for allowing the designer to manipulate various objects provided from Palette or Toolbox 145. For example, a designer wishing to have Button 150, Check Box 165 and Scroll Bars 175 and 185 as part of an application would simply position the control objects onto the Design Surface 105 by, for example, using a mouse and separately dragging each component onto the Design Surface 105. The user can then manipulate these controls in any fashion desirable.

In order to give a systematic and organized appearance, it has become standard practice to align the physical edges of most components with other physical edges. Typically, visual designers will provide grids (e.g., dots 110, lines, etc.) to assist in aligning components with one another. These types of visual code designers, however, have several shortcomings. For example, the design-time UI within the visual code designer will often differ from the corresponding run-time UI. More particularly, the design-time UI displays a grid for laying out object controls, while the run-time UI does not. As such, the design-time grid does not give a user a true visual experience of how the UI will appear during run-time.

Another shortcoming of typical visual designers is the difficulty associated with aligning controls in a desirable fashion. For example, current designers do not allow an extensible way for aligning text within boxes of varying size or aligning text in boxes of the same size with varying font. Further, current visual designers make it difficult to align the centers or other desired alignment positions for controls of varying sizes and types.

Figure 1B:
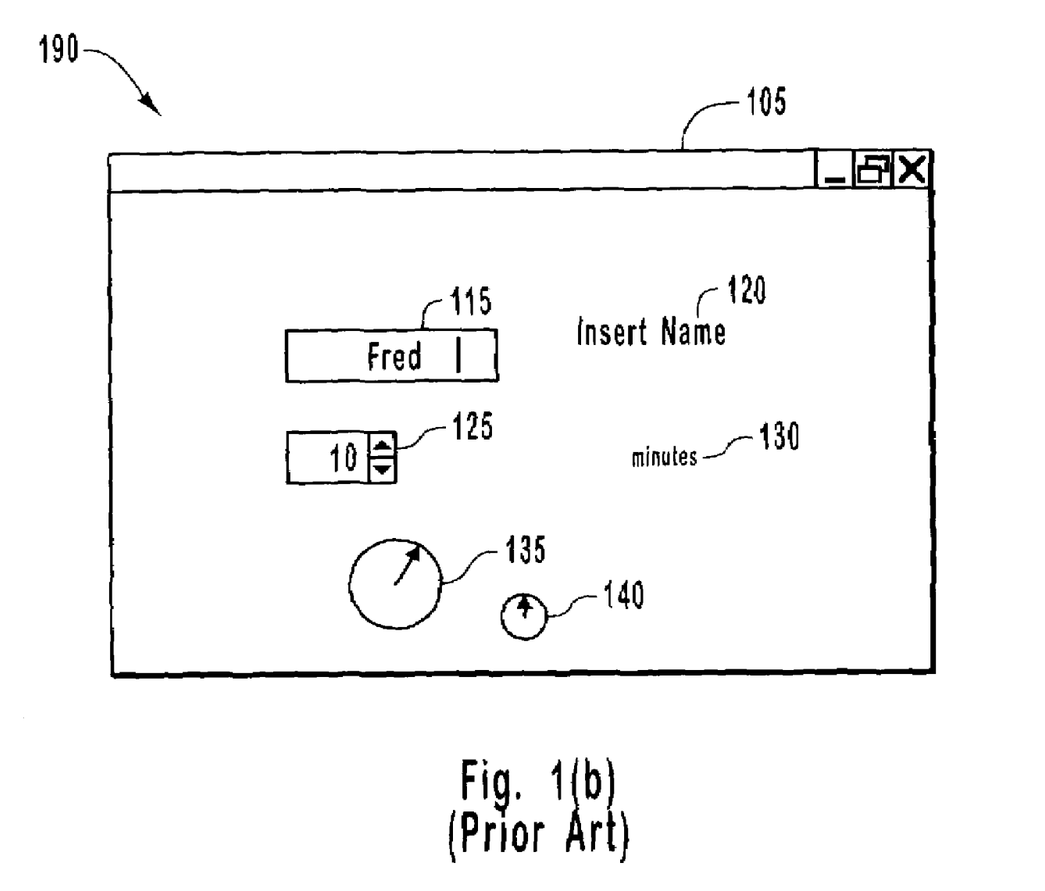
FIG. 1(b) illustrates a user interface developed with the prior art visual code designer of FIG. 1(a) at run-time.

FIG. 1(a) and FIG. 1(b) illustrates an example of the problem with current visual designers when aligning various objects. Referring to FIG. 1(a), during design-time use of Visual Code Designer 100, Text Field 115, Static Text Box 120, Spinner 125, Static Text Box 130 and Dials 135 and 140 have been inserted and aligned in accordance with standard practice using typical Grid Dots 110 on Design Surface 105. As shown in FIG. 1(b), however, during Run-time 190 the alignment of the objects appears if they were randomly placed onto the common Design Surface 105. For example, because Static Text Box 120 is larger in size than Text Field Box 115, the text in Text Field 115 does not line up with the text in Static Text Box 120. Similarly, because Spinner's 125 font size is larger than the font size of Static Text Box 130, the number in Spinner 125 does not line up with the text from Static Text Box 130. A similar problem exists with Dials 135 and 140, which are not properly aligned due to their differing sizes. Although current visual code designers allow for the spacing of the grid dots to be adjusted, the design surface still only allows aligning controls to gridlines rather than to other controls.

Accordingly, there exists a need for methods, systems and computer program products that provide for an extensible UI feedback during the positioning of components by automatically aligning components with other components without the use of gridlines.

BRIEF SUMMARY OF THE INVENTION

In accordance with exemplary embodiments of the present invention, the above identified drawbacks and deficiencies of current visual code designers are overcome. Exemplary embodiments provide for a visual code designer that allows a user to manipulate control objects on a common design surface. Each control object comprises one or more extensible snaplines that define alignment characteristics for the control. The snaplines are extensible in that a developer can specify matching and alignment criteria such as type, filter and offset information. Further, the visual code designer assists the user in positioning a control on the common design surface by automatically aligning the control during design-time without the use of gridlines.

For example, the visual code designer requests extensible snaplines from an unselected control on a visual design surface and monitors the position information for a selected control within the visual design surface. Each snapline of the unselected control on the visual design surface then is compared to each extensible snapline of the selected control to identify matching snaplines. When the selected control snapline is within a predetermined distance of the unselected control snapline, the selected control is automatically snapped into alignment with the unselected control.

In accordance with another example embodiment of the present invention, a visual code designer is provided for helping a user to position a control on a common design surface. The visual code designer provides for receiving one or more snaplines from an unselected control on a visual design surface and receiving position information for a selected control within the visual design surface. A snapline from the unselected control that matches a snapline from the selected control is identified. The unselected control snapline and the selected control snapline are extensible in that a developer can specify matching and alignment criteria. Finally, the selected control is automatically aligned with the unselected control when the selected control snapline is within a predetermined distance of the unselected control snapline.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for an extensible user interface feedback during the positioning of control components to assist a designer with aligning the components on a common design surface. The embodiments of the present invention may comprise a special purpose or general-purpose computer including various computer hardware, as discussed in greater detail below.

A visual code designer is a useful development tool that simplifies the coding of complex user interfaces (UIs) or application development by providing a designer with building blocks (or controls) of UI components. A visual code designer allows the interactive creation of the UI using, for example, a toolbox or palette of controls, a control attribute specification form, a menu hierarchy (menu tree structure), a tool bar, and a common design surface or form. The visual code designer can be used to create a multitude of applications or UIs including, e.g., word processors, database programs, Web pages and browsers, development tools, drawing, paint and image editing programs, communication programs, etc.

Control developers provide reusable program building blocks that can be combined and manipulated with other program building blocks within the design surface of a visual code designer. For consistency purposes, the following description will refer to these building blocks as "controls." As one of ordinary skill in the art will appreciate, however, these building blocks have other common names such as components, widgets, objects, etc. Further, these controls can take on many forms, e.g., a single button in a graphical user interface (GUI), a small interest calculator or even an interface to a database manager. Moreover, control should be interpreted broadly to encompass, e.g., a class, subclass or instance of a class. Accordingly, the use of the term control in the following description is for illustrative purposes only and is not meant to limit the scope of the invention to any particular type of control. Instead, it is used to illustrate any control, object, component, widget, etc. as a class, subclass or instance that can be manipulated and aligned on a design surface.

Controls are software objects that typically include data or attributes and methods implementing the control's behavior. Common controls include: Buttons, Canvases, Checkboxes, Choices, Labels, Lists, Panels, Radio Buttons, Scrollbars, Scroll Panes, Text Areas, Text Fields, Menus, Menu Bars, etc. In an example embodiment, each control has a control designer that specifies, for example, how to draw and move the control at design time. Further, the control designer can specify how the control looks, how the control interacts with other controls, and may include a list of alignment characteristics that define how a control will align relative to other controls on a visual code design form. The control designer allows a control developer to specify, modify or remove alignment and/or matching criteria, herein referred to as snaplines, on a per control basis. As described below, it is this manipulation of the snapline characteristics that make the snaplines of the present invention extensible.

In an example embodiment, each control designer provides a list of alignment criteria, (e.g., as a snapline class object), which a control developer can use in defining alignment for controls. The snapline class may represent a single alignment line for the control, e.g., a vertical or horizontal line along an edge of a control. Each snapline is defined by a group of objects, which may include a Type, Offset and Filter. Type typically is a simple string (but also could be a number, class, object or any other form of identifier) used to define standard or default categories of alignment lines, e.g., Top, Bottom, Left, Right and/or Baseline. Offset represents a distance (e.g., in pixels) from the origin (or other reference point) of the control to the alignment line. Finally, a Filter is a string (or identifier) used to define custom alignment lines, which a control developer can uniquely create and define. Each control designer may contain a list of these objects (i.e., Type, Offset and Filter), which other control vendors can further specify, modify, delete or replace. In other words, the control class is an extensible list of these control objects, which allows control developers and others great flexibility in specifying alignment properties of particular controls.

Figure 2:
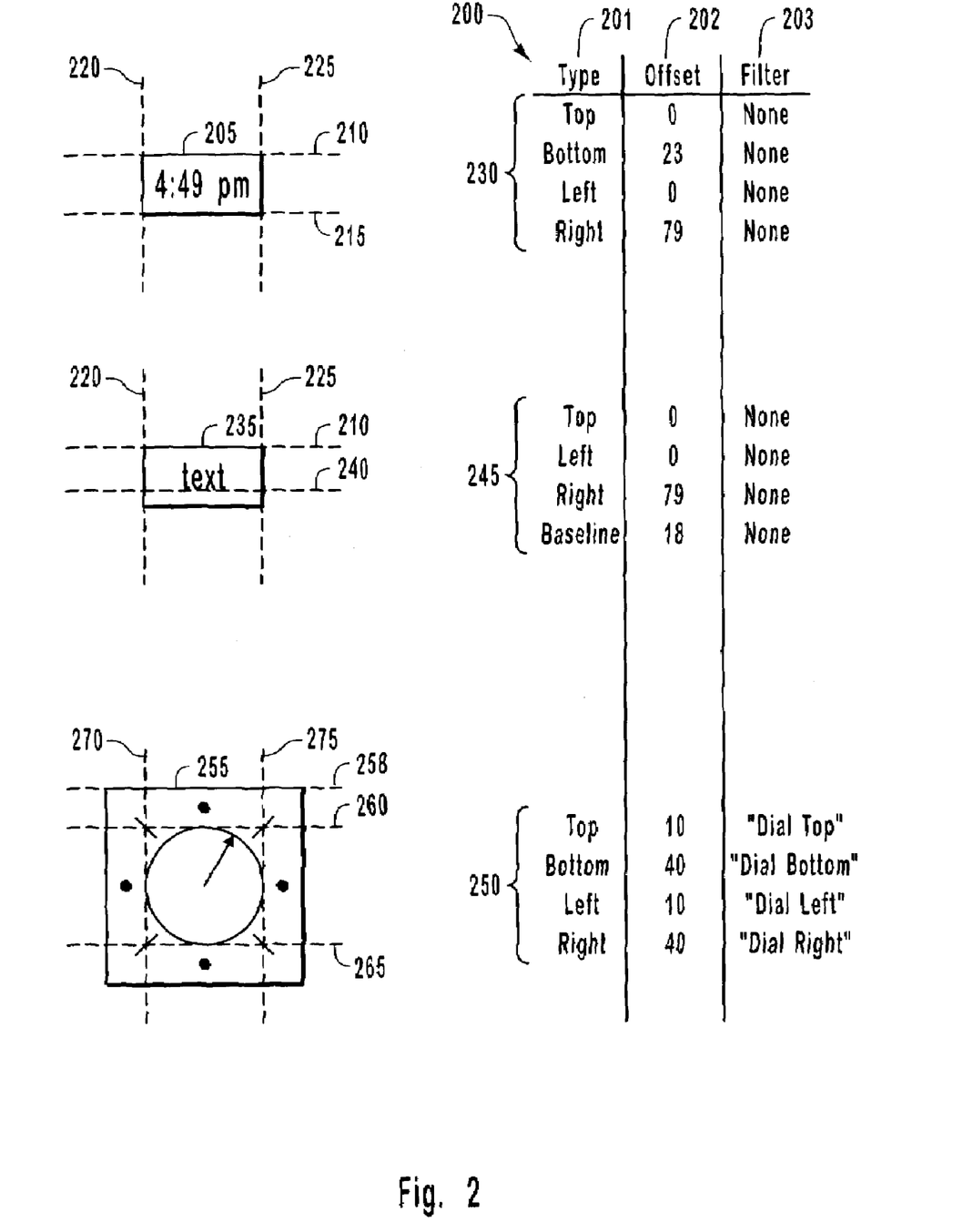
FIG. 2 illustrates various snaplines in accordance with example embodiments.

FIG. 2 shows various example embodiments of alignment properties or characteristics for three different controls. As shown in table 230, Control Clock 205 has standard snapline Types 201 Top, Bottom, Left and Right. The snaplines defined by these Types are represented by Snaplines Top 210, Bottom 215, Left 220 and Right 225. With the origin in the top left corner of Control Clock 205, Top 210 and Left 220 have Offsets 202 of zero, while Bottom 215 and Right 225 are 23 and 79 pixels from the origin, respectively. The Filter object 203 for Control 205 has not been set.

Static Text Control 235 has Snaplines Top 210, Left 220 and Right 225 similar to Control Clock 205. The Filter object 203 for Control 235 also has not been set. Unlike Control Clock 205, however, Text Control 235 has a object Type Baseline, as indicated in table 245, which replaces Control Clock's 205 Bottom Snapline 215. The Baseline is shown as 18 pixels from the origin (i.e., the Top Snapline 210) and is represented by Snapline 240. Accordingly, as described below, the text in Static Text Control 235 can be aligned with other text in controls with similar snapline properties. It is important to note that the pixel value from the origin for the Baseline does not have to be pre-determined, i.e., the control designer can change this value at any time. For example, if a developer changes the font size of his/her textbox, the control designer can now measure the height of the new font size and adjust the Baseline value appropriately.

Due to Dial Control's 255 unique shape, Dial Control 255 lends itself to Filter Snaplines 260, 265, 270, 275 that will uniquely align with controls of similar type. For example, table 250 shows that the Filters 203 for object Type Top, Bottom, Left and Right have been set as "Dial Top," "Dial Bottom," "Dial Left" and "Dial Right," respectively. These Filter class objects for the control are shown as Snaplines Dial Top 260, Dial Bottom 265, Dial Left 270 and Dial Right 275 with Offsets of 10, 40, 10 and 40, respectively, as shown in table 250.

When Filters 203 are set, as in the control designer for Dial Control 255, the settings in Filters 203 override the default Types 201. Further, the custom Filter Snaplines 260, 265, 270, 275 will only align with other custom filter snaplines defined by the same string. Accordingly, for example, the Top line 258 of Dial Control 255 will no longer align with other Type 201 Tops, but instead the Dial Top Snapline 260 will align with other controls that have the same Dial Top snapline string. It should be noted, however, that Filters 203 do not have to override default Types 201. As such, for example, Dial Control 255 could have Snapline Top 258 and Snapline Dial Top 260, along with any other combination of snaplines. That is, the snapline class and the list of objects can include or exclude a wide variety of Types, Offsets and Filters.

Figure 3:
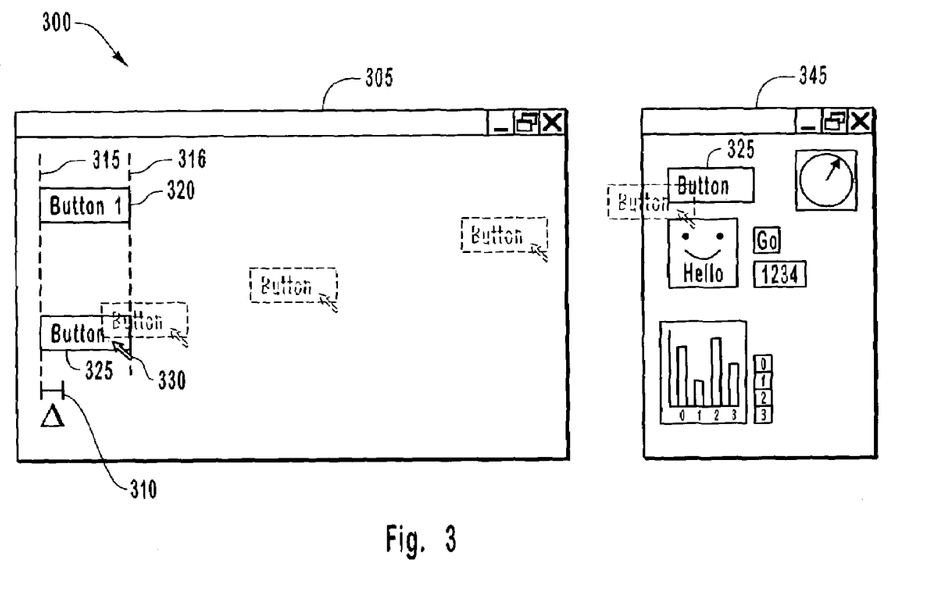
FIG. 3 illustrates the positioning a control on a design surface in accordance with example embodiments.

FIG. 3 illustrates the basic alignment of two Control Buttons 320 and 325 using extensible snaplines in accordance with example embodiments. A Visual Code Designer 300 is provided with a Design Surface 305 and a Toolbox 345 with various control classes, e.g., Button 325. As illustrated by Button 320, a user can create a specific instance of a control class by placing it onto the Design Surface 305 and uniquely identifying it with its own characteristics, e.g., a new name. To align a control with similar characteristics as the already placed Control 320, a user can, e.g., select Button 325 with cursor 330 and drag Button 325 onto the Design Surface 305. As one of ordinary skill in the art would recognize, the above described selection and dragging of Button 325 can also be done in any of a number of ways, e.g., using arrow keys from a key pad, etc. In addition, the present invention can be implemented when resizing a control or any other manipulation of positioning. As such the following is merely an illustrative example of how controls may be aligned and is not meant to limit the scope of the invention to any particular type of placement or positioning of a control.

When Button 325 is selected for positioning onto Design Surface 305, Visual Code Designer 300 obtains snapline class information for Button 320 and matches the objects of Button 320 with those of Button 325 with like properties. For example, when Button 325 is selected, Visual Code Designer 300 obtains information that Button 320 has Snapline Types Top, Bottom, Left and Right and compares and matches this information with Button 325's Snapline Types of Top, Bottom, Left and Right. As the positioning of Button 325 changes, the Visual Code Designer 305 continually monitors the position of the Snaplines for Button 325 relative to those Snaplines of Button 320.

In accordance with an example embodiment, when a snapline of Button 325 approaches a matching snapline of Button 320 (based on matching criteria for Button 320, such as snapline Type and/or Filter) Button 325 is automatically snapped into position. For example, as shown in FIG. 3, when the Left Snapline of Button 325 comes within a distance Δ 310 of the Left Snapline for Button 320, Button 325 is automatically snapped into alignment with the left edge of Button 320. Temporary dashed line 315 is displayed as a visual indication to the user that Button 325 has been "snapped-on" to Button 320. Of course, a control may be simultaneously aligned to multiple snaplines, illustrated by temporary dashed lines 315 and 316 for the Left Snapline and Right Snapline of Button 320. Further, it is important to note that the dashed lines 315 and 316 are mere examples of a visual feedback given to the user and any type of visual indication that a control has been snapped would also be suitable for this invention. For example, the dashed lines 315 and 316 could be solid or dotted lines. In an alternative example, the edges of the controls could glow, throb, etc.

In an alternative embodiment, Button 325 is automatically snapped into place when its left edge is directly aligned with Button 320's left edge, and further movement of Button 325 is temporarily disabled. This "snapped-off" disablement feature might be for a predetermined time period or it might be for a set distance (e.g., Δ 310) while the user attempts to move or otherwise reposition Button 325. Similar to snap-on, temporary dashed lines 315 and 316 are drawn to give the user a visual feedback that the selected Button 325 has been snapped into alignment with Button 320. It should be emphasized that snapping into alignment may use the foregoing snapped-on and snapped-off embodiments alone or in any combination.

Figure 4:
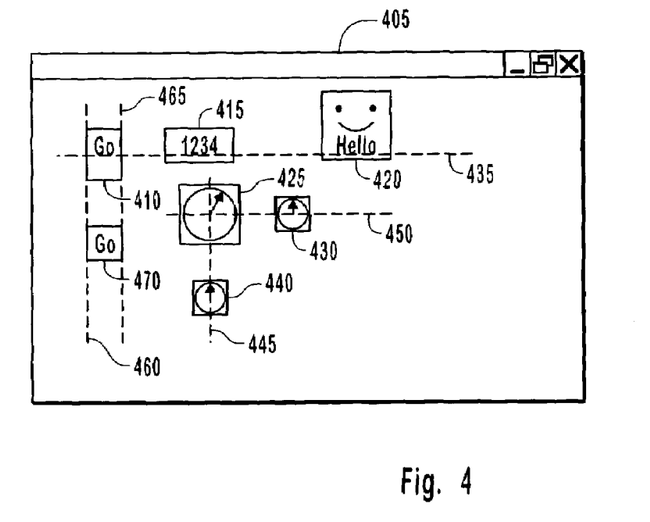
FIG. 4 illustrates potential extensible snaplines characteristics in accordance with example embodiments.

FIG. 4 illustrates how various snaplines can be used to align various controls with like snaplines. For example, the Text Baseline in Go Control 410 can be aligned with the Text Baseline in 1234 Control 415, which can also be aligned with the Text Baseline of Hello Control 420, as shown by Snapline 435. The left and right edge of the Go Control 410 can be aligned with the left and right edge of Go Control 470 as indicated by Left and Right Snaplines 460 and 465, respectively. The centers of Dial Controls 425, 430 and 445 can be aligned using filters in the manner described above, which define a Horizontal Center Snapline 450 and a Vertical Center Snapline 445.

Figure 5:
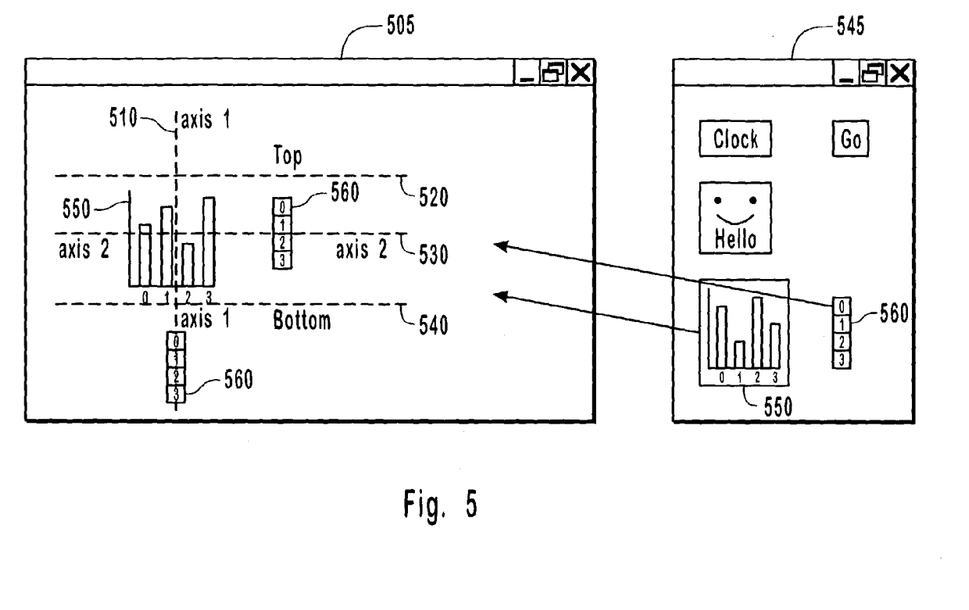
FIG. 5 illustrates potential filtered snapline characteristics in accordance with example embodiments.

FIG. 5 further illustrates the use of filtered snapline characteristics in accordance with example embodiments. A Graph Control 550 is defined with Snaplines Axis1 510 and Axis2 530, which define the vertical and horizontal center axis for Graph Control 550. Default Top and Bottom Snaplines for Graph Control 550 are shown by dashed lines 520 and 540, respectively. In a manner as that described above with regard to defining custom filters, a control developer could also create another Control 560 that has Snaplines Axis1 510 and Axis2 530. Note, however, that the Offset value of these controls might differ by several pixels. Nevertheless, if the Snaplines of Graph Control 550 are of matching Filter strings to those of Control 560, these snaplines 510 and 530 will snap-on or snap-off to each other.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 6:
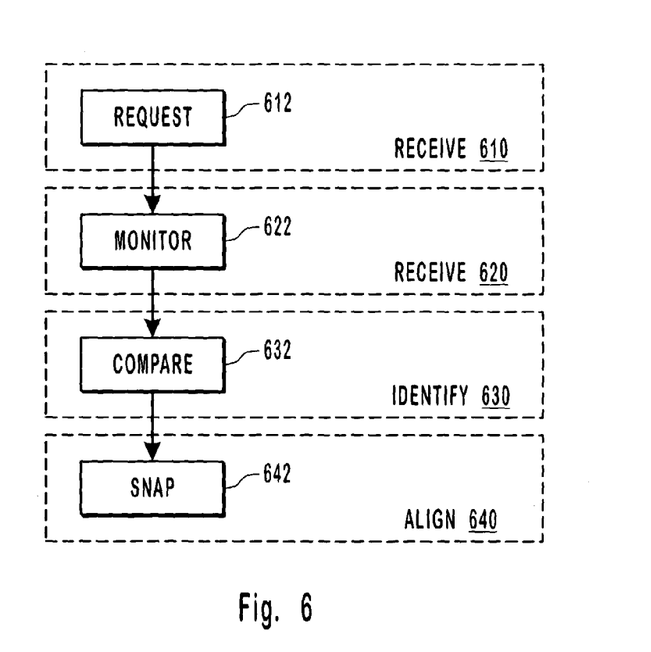
FIG. 6 illustrates example acts of and steps for methods of assisting a user to position a control on a common design surface in accordance with example embodiments.

FIG. 6 illustrates example steps and acts used in helping a user of a visual code designer automatically align controls during design-time without the use of gridlines. A step for Receiving (610) one or more snaplines from an unselected control on a visual design surface may include the act of Requesting (612) the one or more snaplines from the unselected control. These snaplines may contain type, offset and filter properties or characteristics and are extensible, as described above.

A step for Receiving (620) position information for a selected control within the visual design surface may include the act of Monitoring (622) position information for the selected control. The positioning information could be from either movement of the entire control itself or from movement of any portion of it, e.g., resizing the control. The movement might be from a selection and drag operation with a cursor, or it might by from movement with key strokes from a keyboard. In an example embodiment, an algorithm is used for monitoring position by taking a "snap shot" of control movement. The positioning is continuously monitored for use in determining the location of the selected control at all times while in the design surface. A drag assistance manager can be utilized in determining the movement of a control.

A step for Identifying (630) a snapline from the unselected control on the visual design surface that matches a snapline from the selected control may include the act of Comparing (632) each snapline of the unselected control on the visual design surface to each snapline of the selected control. Both the unselected control snapline and the selected control snapline identified are extensible in that a developer can specify matching and alignment criteria. The matching criteria being, for example, type and filter objects of the snapline class, wherein alignment criteria might be the offset from the origin. The type matching criteria might be any one or combination of a top, bottom, left edge, right edge and/or a baseline for aligning text. Any combination of these could be used as default snapline settings. Filters are another example of matching criteria and can be set to override, add to or replace the default settings. They are typically strings and can be defined anywhere within the control itself using the alignment criteria such as an offset. The offset origin can be defined from anywhere within the control; however, typically it is defined from a corner or edge of the control.

A step of automatically Aligning (640) the selected control with the unselected control when the selected control snapline is within a predetermined distance of the unselected control snapline may include the act of automatically Snapping (642) the selected control into alignment. As previously mentioned, the automatic alignment of the selected control with the unselected control may be accomplished in various ways. For example, the alignment could be a snap-on alignment, wherein the identified snapline of the selected control is snapped into alignment when it is with a few pixels of the matching snapline of the unselected control. It should be noted that this distance can be any value; however, typically it will be less than a few hundred pixels.

In an alternative embodiment, the alignment could be a snap-off alignment, wherein the identified snapline of the selected control is snapped into alignment when it is directly aligned with the snapline of the unselected control. The selected control is then snapped-off the unselected control by either further movement of the control or after a predetermined period of time. Whether the control is snapped-on, snapped-off, or some combination of snapped-on and snapped-off, when the selected control is directly snapped into alignment with the unselected control a temporary visual line is drawn along the snaplines to indicate that the selected control has been snapped into alignment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 7:
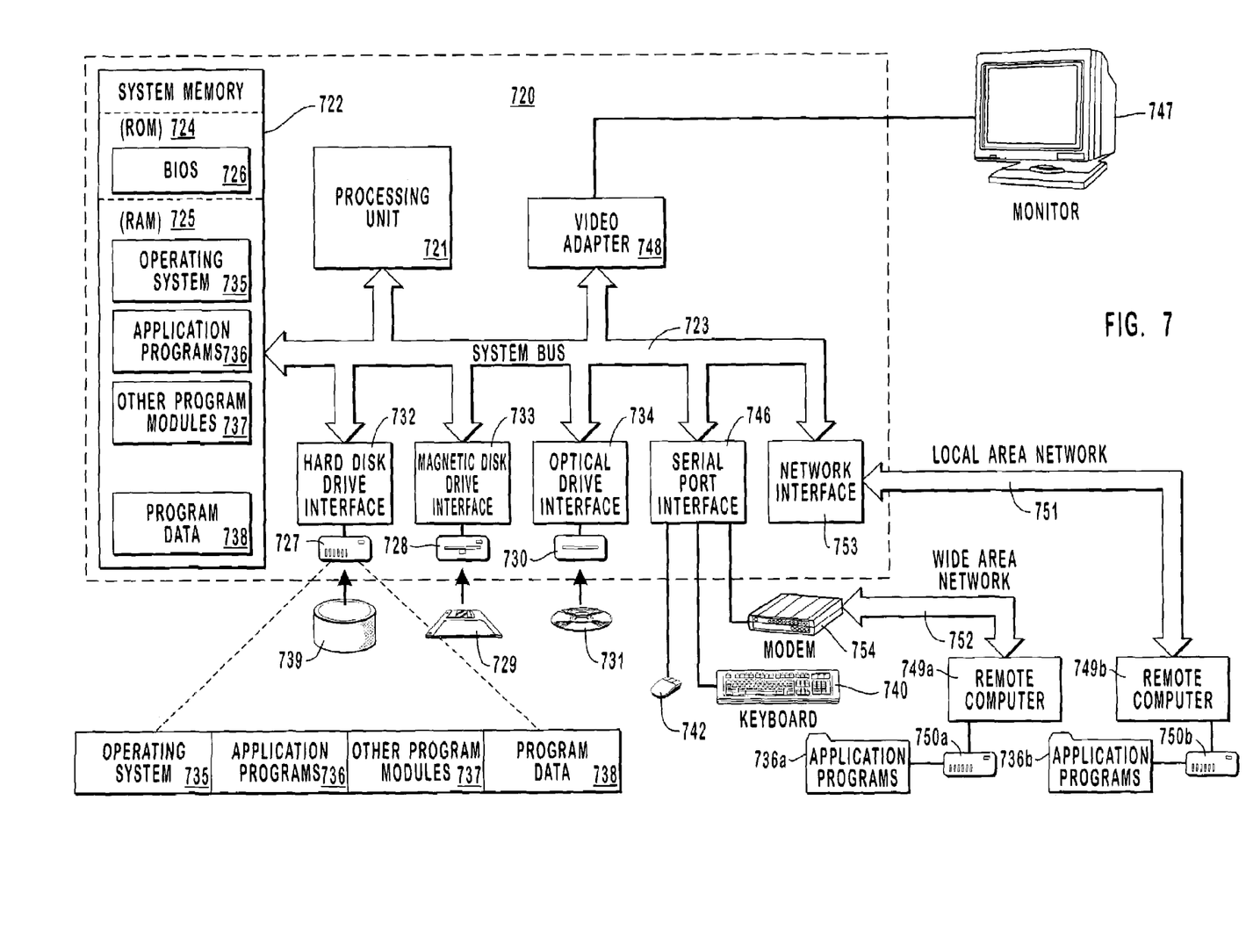
FIG. 7 illustrates an example system that provides a suitable operation environment for the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 35, one or more application programs 36, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749*a* and 749*b*. Remote computers 749*a* and 749*b* may each be another personal computer, a server, a router, a network PC, a peer device or other common network node, and typically include many or all of the elements described above relative to the computer 720, although only memory storage devices 750*a* and 750*b* and their associated application programs 736*a* and 736*b* have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a visual code designer that allows a user to manipulate a plurality of control objects on a common design surface, wherein each control object comprises one or more extensible snaplines that define alignment characteristics for each control, a method of helping the user to position a control on the common design surface by automatically aligning the control during design-time without the use of gridlines, the method comprising acts of:

specifying snaplines for each of a plurality of controls, wherein each of the specified snaplines belongs to a particular control, and wherein each specified snaplines is extensible in that a developer can specify matching and alignment criteria;

requesting one or more snaplines from an unselected control on a visual design surface;

monitoring position information for a selected control within the visual design surface;

comparing each snapline of the unselected control on the visual design surface to each snapline of the selected control;

identifying a snapline of the unselected control that matches a snapline of the selected control based upon the developer-specified matching criteria; and in response to the snapline of the selected control being moved within a predetermined distance of the snapline of the unselected control, snapping the selected control into alignment with the unselected control.

2. The method of claim 1, wherein the matching criteria specified by the developer for the unselected control snapline and the selected control snapline comprises at least one of a type or filter.

3. The method of claim 2, wherein the type comprises a string identifying one or more of a top, bottom, left, right, or baseline.

4. The method of claim 3, wherein when the matching criteria comprises a filter, the filter is a unique string specified by the developer different from the type string.

5. The method of claim 3, wherein when the matching criteria comprises a filter, the filter is a unique string specified by the developer that overrides one or more of the type strings.

6. The method of claim 1, wherein the alignment criteria specified by the developer of the unselected control snapline and the selected control snapline comprises an offset value measured from an edge of the respective control.

7. The method of claim 6, wherein the offset is measured in pixels.

8. The method of claim 1, wherein the selected control is automatically snapped into alignment by one of moving or resizing the selected control.

9. The method of claim 1, wherein the predetermined distance of the unselected control is zero, and wherein the act of automatically snapping further comprises the act of:
disallowing positioning of the selected control for a second predetermined distance after the selected control is automatically snapped into alignment.

10. The method of claim 1, wherein the act of automatically snapping further comprising the acts of:
drawing a temporary line along an alignment path between the selected control snapline and the unselected control snapline upon automatically snapping the selected control into alignment with the unselected control.

11. The method of claim 1, wherein the selected control position information is being monitored while the selected control is being moved.

12. The method of claim 1, wherein the selected control position information is being monitored while the selected control is being resized.

13. In a visual code designer that allows a user to manipulate a plurality of control objects on a common design surface, wherein each control object comprises one or more extensible snaplines that define alignment characteristics for each control, a method of helping the user to position a control on the common design surface by automatically aligning the control during design-time without the use of gridlines, the method comprising steps for:
specifying snaplines for each of a plurality of controls, wherein each of the specified snaplines belong to a particular control and wherein each snapline is extensible in that a developer can specify matching and alignment criteria;
receiving one or more snaplines from an unselected control on a visual design surface;
receiving position information for a selected control within the visual design surface;
identifying a snapline from the unselected control on the visual design surface that matches a snapline from the selected control based upon the developer-specified matching criteria; and
in response to the selected control snapline being moved within a predetermined distance of the unselected control snapline, aligning the selected control with the unselected control.

14. The method of claim 13, wherein the matching criteria specified by the developer for the unselected control snapline and the selected control snapline comprises at least one of a type or filter.

15. The method of claim 14, wherein the type comprises a string identifying one or more of a top, bottom, left, right, or baseline.

16. The method of claim 15, wherein when the matching criteria comprises a filter, the filter is a unique string specified by the developer that overrides one or more of the type strings.

17. The method of claim 14, wherein when the matching criteria comprises a filter, the filter is a unique string specified by the developer different from the type stung.

18. The method of claim 14, wherein the alignment criteria specified by the developer of the unselected control snapline and the selected control snapline comprises an offset value measured from an edge of the respective control.

19. The method of claim 18, wherein the offset is measured in pixels.

20. The method of claim 14, wherein the selected control is automatically snapped into alignment by one of moving or resizing the selected control.

21. The method of claim 20, wherein the predetermined distance of the unselected control is zero, and wherein the step for automatically aligning further comprises steps for:
disabling the movement or resizing of the selected control for a second predetermined distance after the selected control is automatically aligned.

22. The method of claim 13, wherein the step for automatically aligning further comprising the acts of:
drawing a temporary line along an alignment path between the selected control snapline and the unselected control snapline upon automatically aligned the selected control into alignment with the unselected control.

23. The method of claim 13, wherein the selected control position information is being monitored while the selected control is being moved.

24. The method of claim 13, wherein the selected control position information is being monitored while the selected control is being resized.

25. In a visual code designer that allows a user to manipulate a plurality of control objects on a common design surface, wherein each control object comprises one or more extensible snaplines that define alignment characteristics for each control, a computer program product comprising a computer readable storage medium carrying computer executable instructions that, when executed by a computing system, implement the method recited in claim 1.

26. The computer program product of claim 25, wherein the matching criteria specified by the developer for the unselected control snapline and the selected control snapline comprises at least one of a type or filter.

27. The computer program product of claim 26, wherein the type comprises a string identifying one or more of a top, bottom, left, right, or baseline.

28. The computer program product of claim 26, wherein when the matching criteria comprises a filter, the filter is a unique string specified by the developer different from the type string.

29. The computer program product of claim 26, wherein when the matching criteria comprises a filter, the filter is a unique string specified by the developer that overrides one or more of the type strings.

30. The computer program product of claim 26, wherein the alignment criteria specified by the developer of the unselected control snapline and the selected control snapline comprises an offset value measured from an edge of the respective control.

31. The computer program product of claim 25, wherein the selected control is automatically snapped into alignment by one of moving or resizing the selected control.

32. The computer program product of claim 25, wherein the predetermined distance of the unselected control is zero, and wherein the act of automatically snapping further comprises the act of:
disallowing positioning of the selected control for a second predetermined distance after the selected control is automatically snapped into alignment.

33. The computer program product of claim 25, wherein the act of automatically snapping further comprising the acts of:

drawing a temporary line along an alignment path between the selected control snapline and the unselected control snapline upon automatically snapping the selected control into alignment with the unselected control.

34. In a visual code designer that allows a user to manipulate a plurality of control objects on a common design surface, wherein each control object comprises one or more extensible snaplines that define alignment characteristics for each control, a computer program product comprising a computer readable storage medium carrying computer executable instructions that, when executed by a computing system, implement the method recited in claim 13.

35. The computer program product of claim 34, wherein the matching criteria specified by the developer for the unselected control snapline and the selected control snapline comprises at least one of a type or filter.

36. The computer program product of claim 35, wherein the type comprises a string identifying one or more of a top, bottom, left, right, or baseline.

37. The computer program product of claim 35, wherein when the matching criteria comprises a filter, the filter is a unique string specified by the developer different from the type string.

38. The computer program product of claim 35, wherein when the matching criteria comprises a filter, the filter is a unique string specified by the developer that overrides one or more of the type strings.

39. The computer program product of claim 35, wherein the alignment criteria specified by the developer of the unselected control snapline and the selected control snapline comprises an offset value measured from an edge of the respective control.

40. The computer program product of claim 34, wherein the selected control is automatically snapped into alignment by one of moving or resizing the selected control.

41. The computer program product of claim 34, wherein the predetermined distance of the unselected control is zero, and wherein the step for automatically aligning further comprises the act of:

disallowing positioning of the selected control for a second predetermined distance after the selected control is automatically aligned.

42. The computer program product of claim 34, wherein the step for automatically aligning further comprising the steps for:

drawing a temporary line along an alignment path between the selected control snapline and the unselected control snapline upon automatically aligning the selected control into alignment with the unselected control.

* * * * *